Jan. 6, 1953 C. H. HARTMAN ET AL 2,624,539
APPARATUS FOR FILLING VALVE BAGS AND CONTROL MEANS THEREFOR
Filed March 6, 1948 9 Sheets-Sheet 4
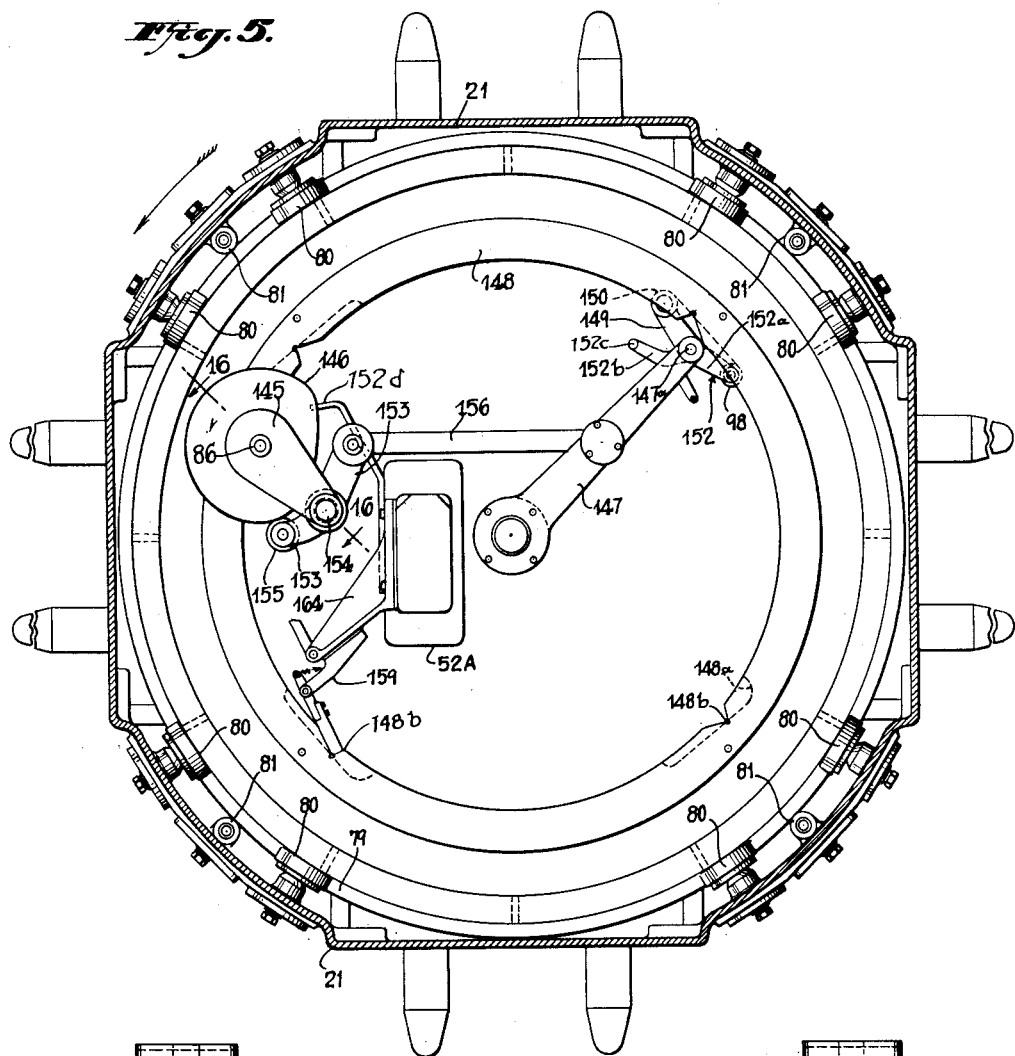
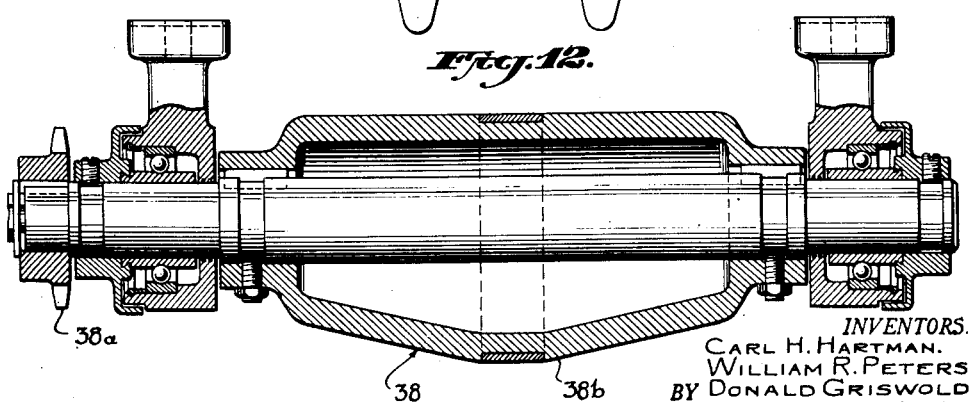
INVENTORS.
CARL H. HARTMAN.
WILLIAM R. PETERSON.
BY DONALD GRISWOLD.
Ward, Crosby & Neal
their ATTORNEYS.

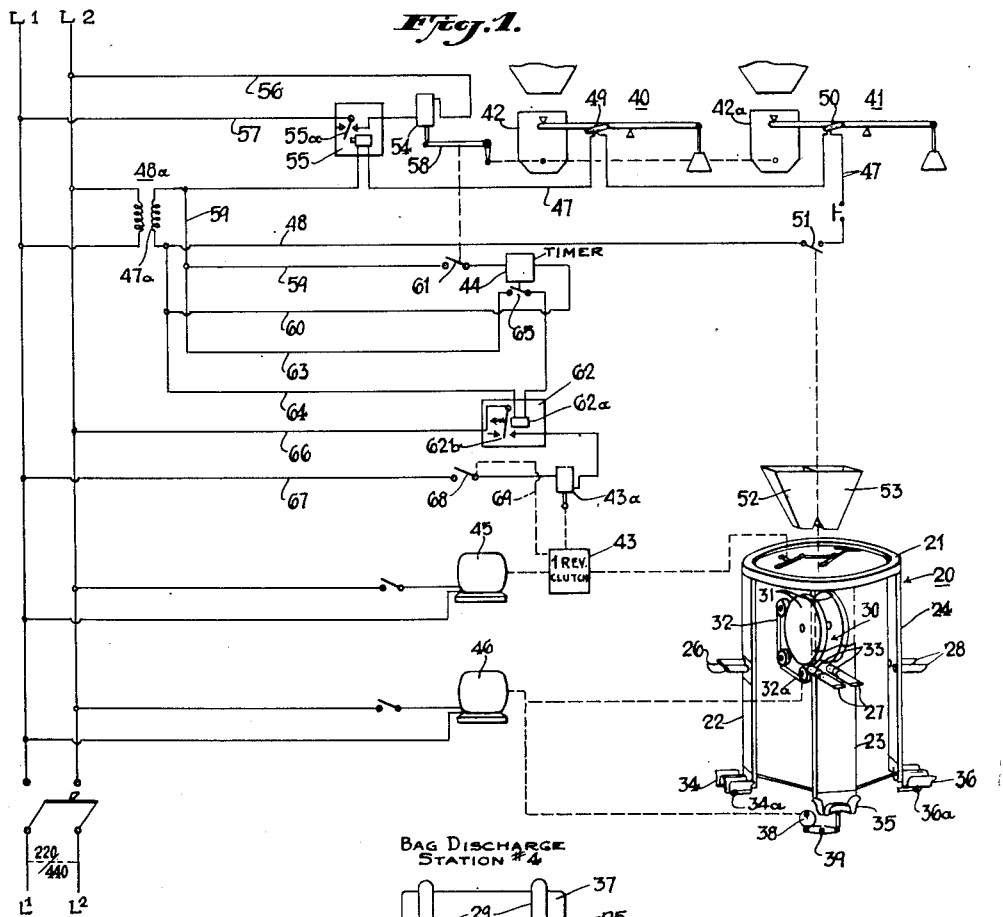

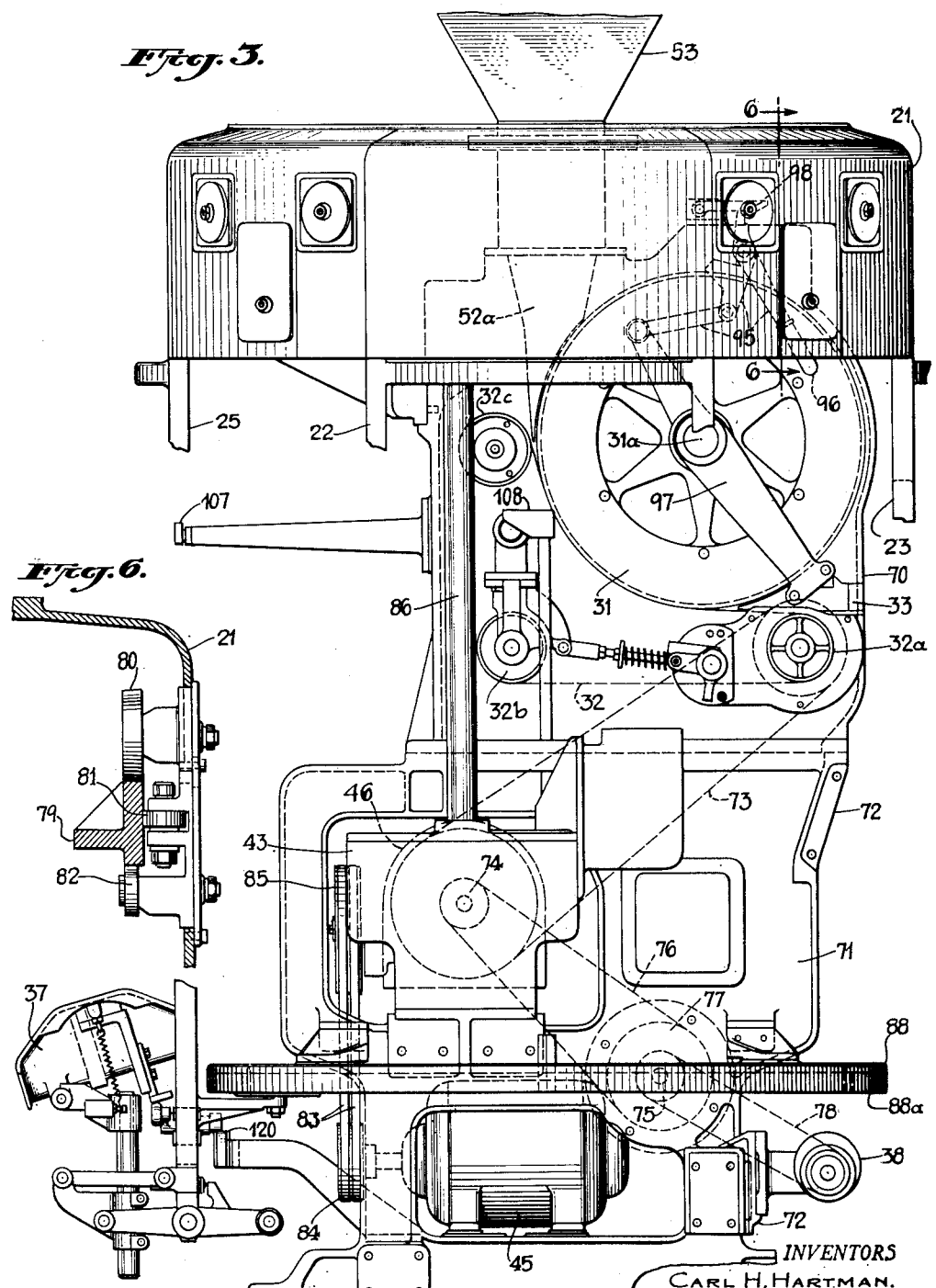

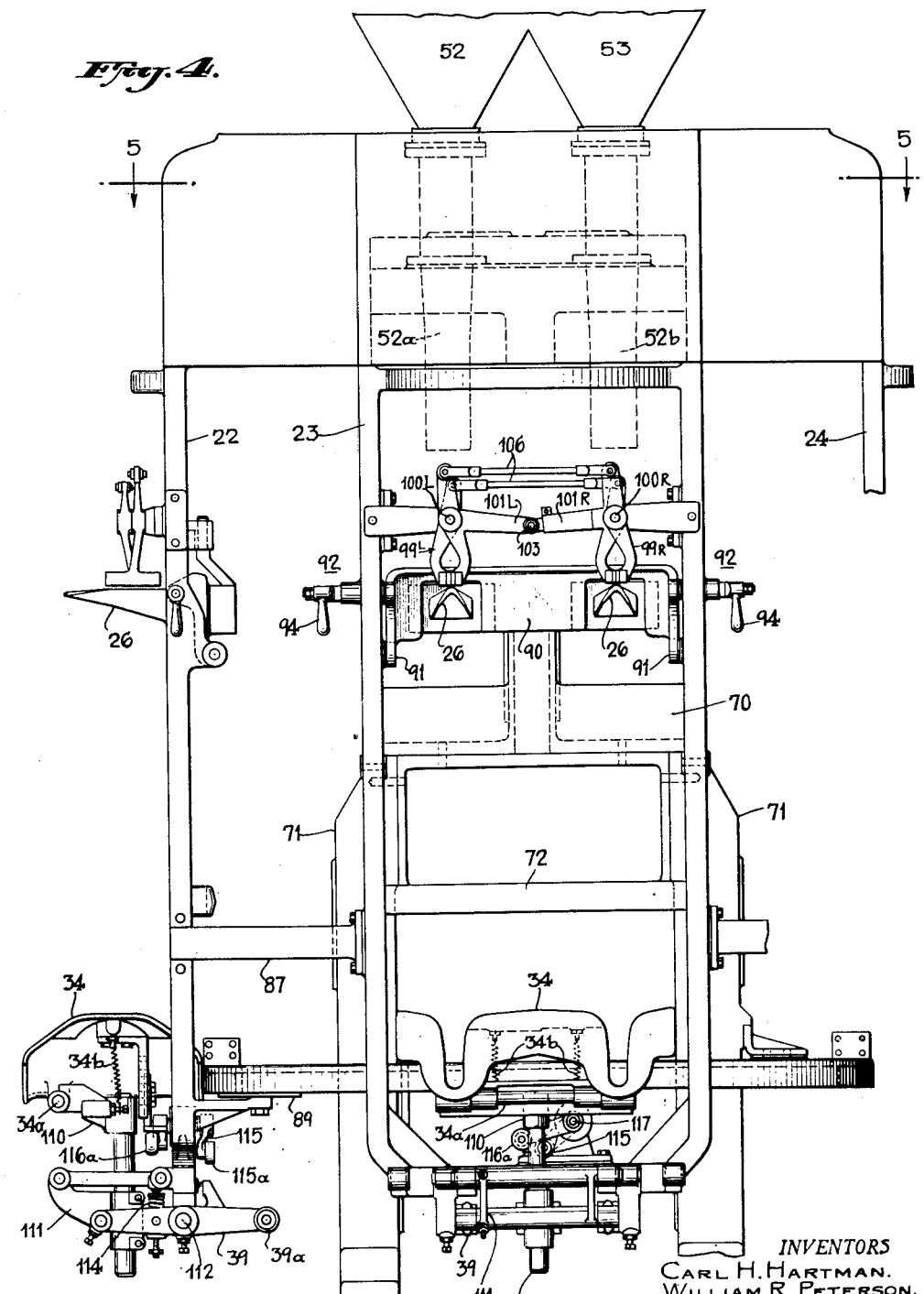

Jan. 6, 1953          C. H. HARTMAN ET AL          2,624,539
APPARATUS FOR FILLING VALVE BAGS AND CONTROL MEANS THEREFOR
Filed March 6, 1948          9 Sheets-Sheet 5
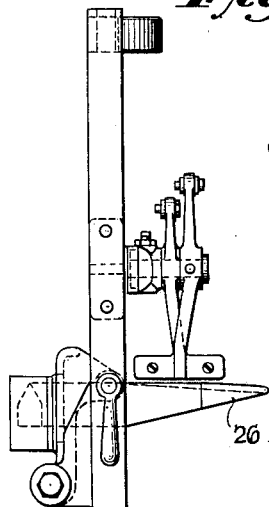
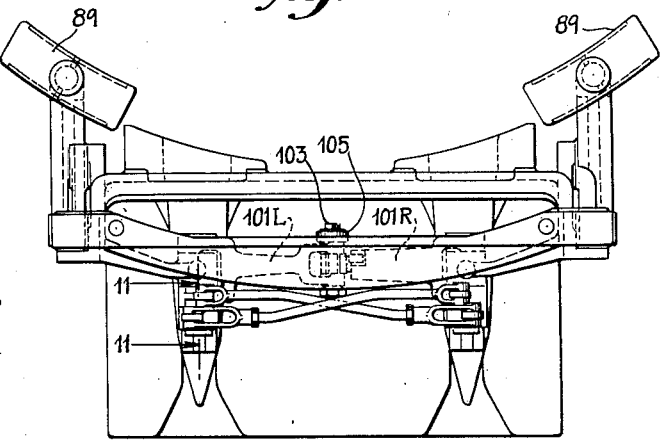
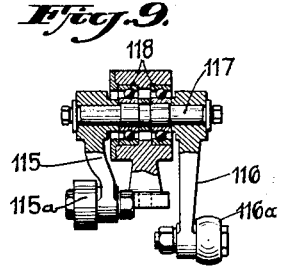
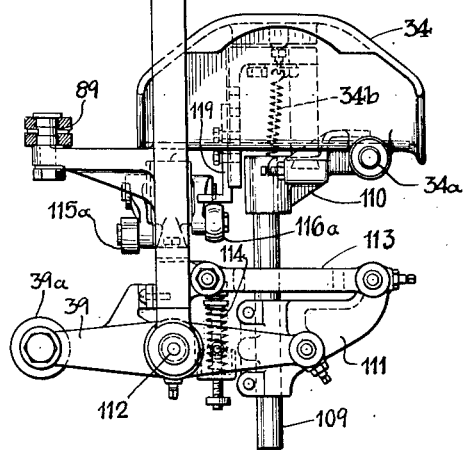
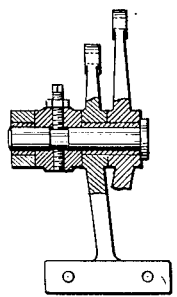
INVENTORS
CARL H. HARTMAN.
WILLIAM R. PETERSON.
BY DONALD GRISWOLD.
*their* ATTORNEYS.

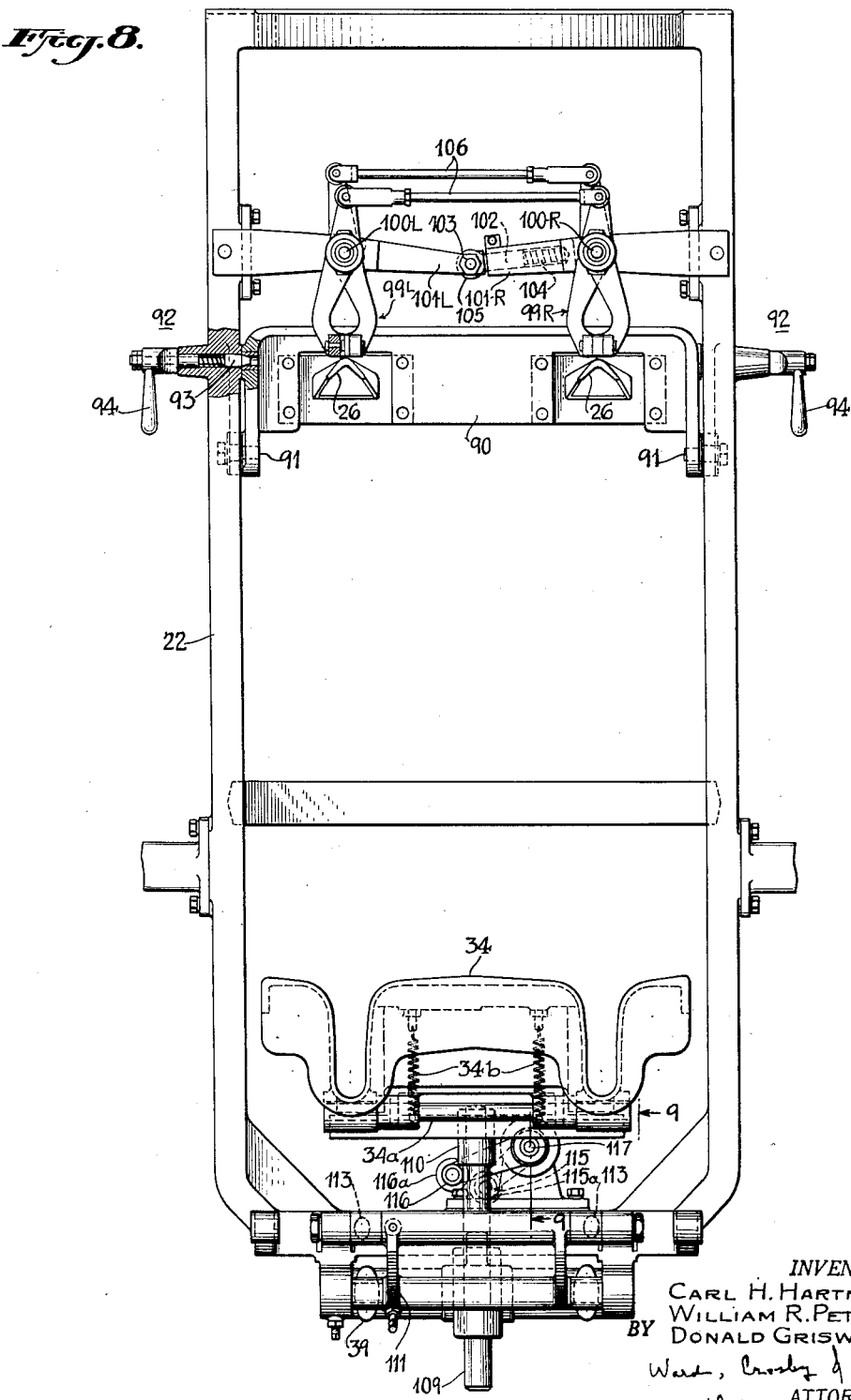

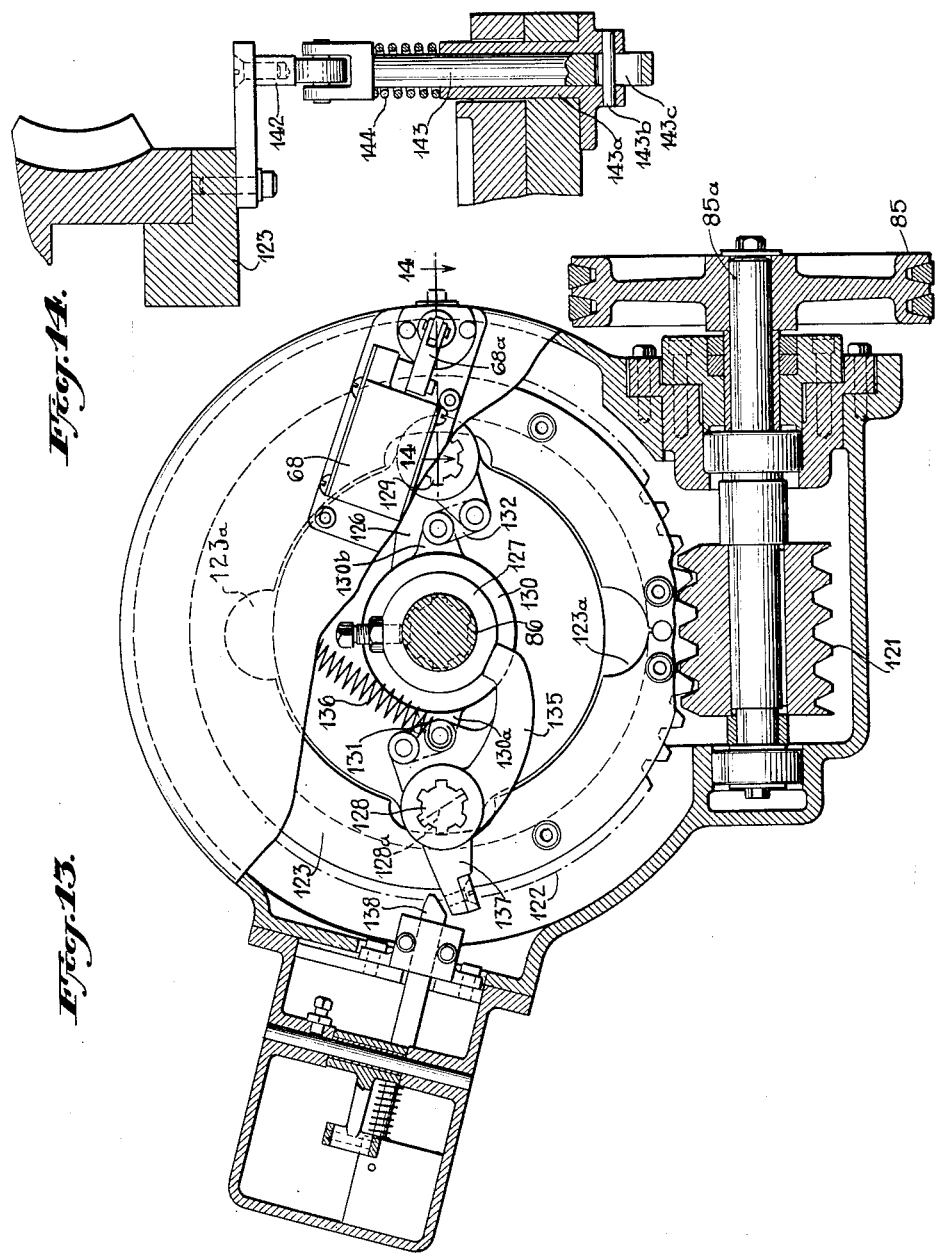

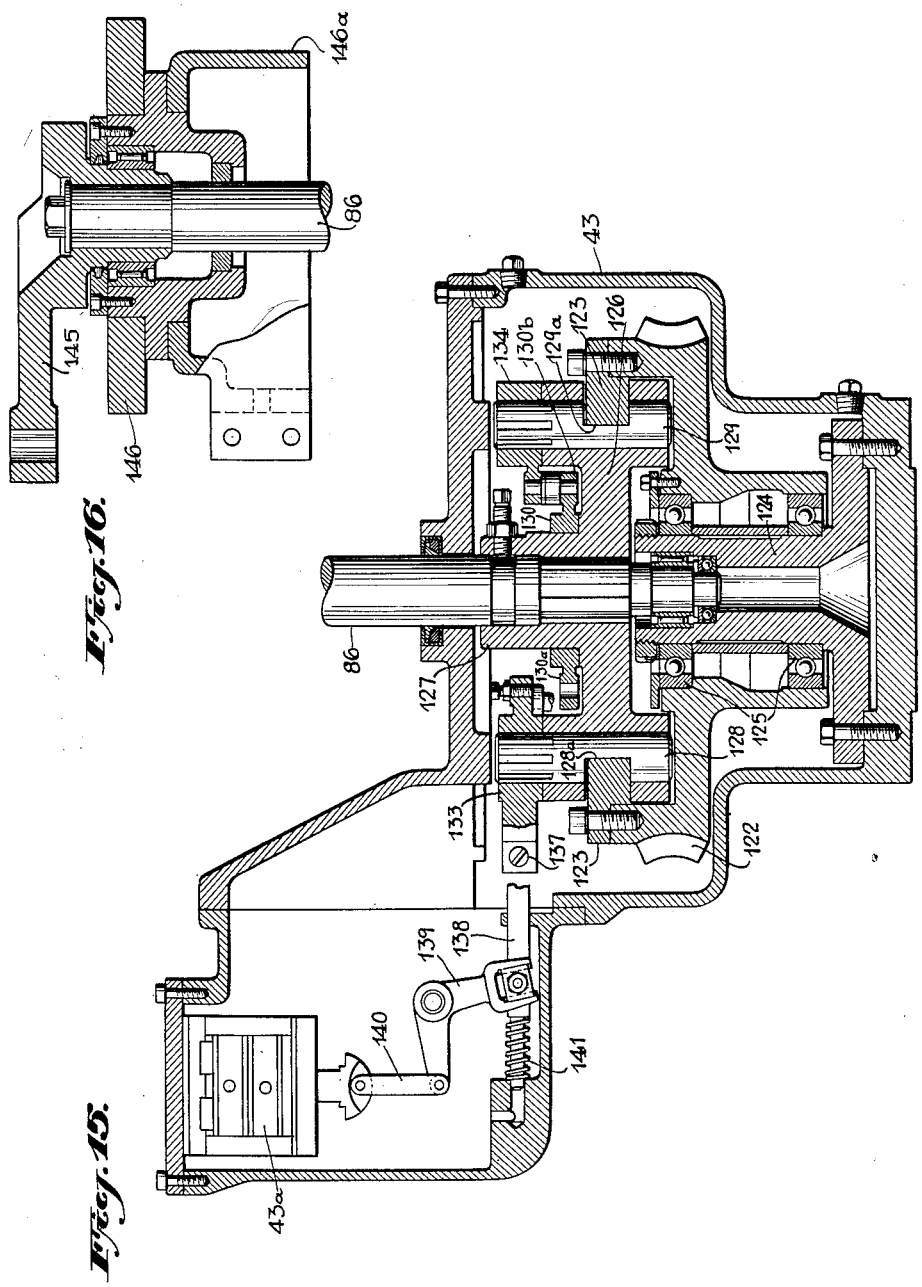

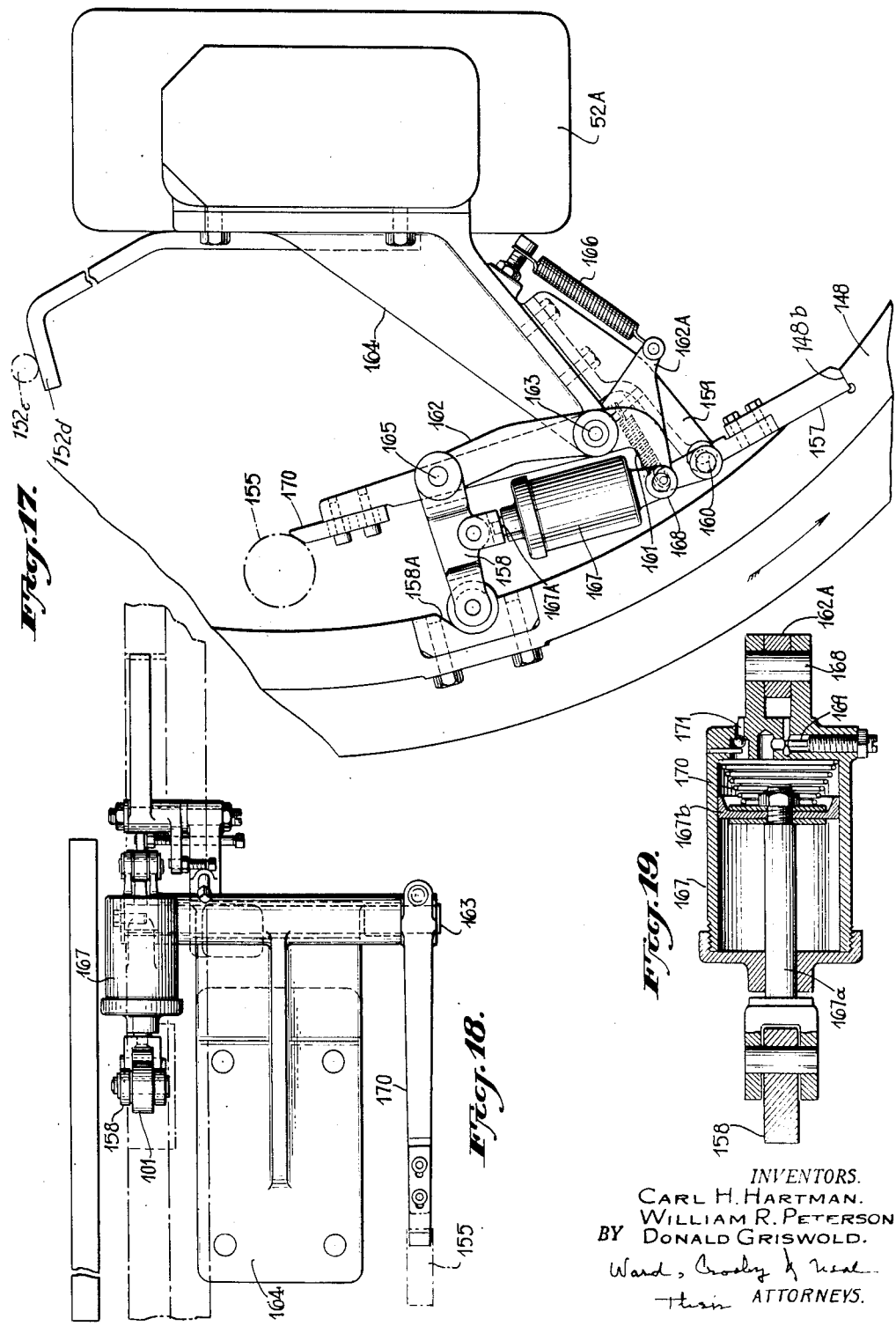

Patented Jan. 6, 1953

2,624,539

UNITED STATES PATENT OFFICE 2,624,539

APPARATUS FOR FILLING VALVE BAGS AND CONTROL MEANS THEREFOR

Carl H. Hartman, New Rochelle, and William R. Peterson and Donald D. Griswold, Oswego, N. Y., assignors to St. Regis Paper Company, New York, N. Y., a corporation of New York Application March 6, 1948, Serial No. 13,364

12 Claims. (Cl. 249—18)

1

This invention relates to apparatus for filling valve bags with powdered granular or other finely divided material, and more particularly to improvements in apparatus for supporting, moving and discharging a plurality of valve bags relative to a valve bag packer. The invention also relates to improvements in apparatus for controlling the feeding of preweighed charges of material successively to a plurality of valve bags.

Apparatus of this type which has been heretofore suggested is subject to the disadvantage of a relatively low output of filled bags per hour because of inability accurately and rapidly to position bags in filling relation to the filling machine and to feed charges thereto at the proper time and speed.

According to the present invention apparatus are provided for overcoming the above difficulties.

Various, further and more specific objects, features and advantages of the invention will clearly appear from the detailed description given below taken in connection with the accompanying drawings which form a part of this specification and illustrate, by way of example, preferred arrangements of apparatus for carrying out the invention. However, it is understood that the drawings are for purposes of illustration only and do not define the limits of the invention, reference being had for this latter purpose to the appended claims.

In the drawings:

Fig. 1 is a schematic diagram of the invention with certain parts omitted for purposes of clarity, illustrating one plan for electrically interconnecting the electrically operable parts of the invention, and also illustrating the operative interconnection between certain other parts of the invention;

Fig. 2 is a diagrammatic view of a rotatable member which supports a plurality of filling tubes, the diagram illustrating the relative angular positions at which certain operations occur;

Fig. 3 is a side view with parts broken away of apparatus embodying the invention;

Fig. 4 is a front view of the apparatus shown in Fig. 3;

Fig. 5 is a sectional view taken substantially on line 5—5 of Fig. 4;

Fig. 6 is a fragmentary sectional view taken along line 6—6 of Fig. 3;

Fig. 7 is a detailed side elevation of a frame member upon which are mounted filling tubes and a bag chair employed in the present invention;

2

Fig. 8 is a front view of the parts shown in Fig. 7;

Fig. 9 is a sectional view taken substantially along line 9—9 of Fig. 8;

Fig. 10 is a plan view of the parts shown in Fig. 8;

Fig. 11 is a sectional view taken along line 11—11 of Fig. 10;

Fig. 12 is a front view partly in section and with parts broken away showing in enlarged detail an eccentric employed in the present invention for oscillating a bag chair;

Fig. 13 is a plan view partly in section and with parts broken away of a one-revolution clutch employed in the present invention;

Fig. 14 is a fragmentary sectional view taken substantially along line 14—14 of Fig. 13;

Fig. 15 is a side elevation partly in section and with parts broken away of the clutch shown in Fig. 13;

Fig. 16 is a sectional view with parts broken away and certain parts omitted taken substantially on line 16—16 of Fig. 5;

Fig. 17 is an enlarged detailed view of a detent and a controlling linkage therefor employed for holding a rotatable ring of Fig. 5 in a predetermined angular position;

Fig. 18 is a side view of the parts shown in Fig. 17; and

Fig. 19 is a detailed sectional view of a dashpot employed in Figs. 17 and 18.

The invention, in one aspect thereof, consists of a combination with a packer or valve bag filling machine having a discharge port, of a movable member having mounted thereupon a plurality of filling tubes, the movable member being adapted for movement, for example, about a vertical axis relative to the valve bag filling machine whereby said tubes can be successively brought into register with the discharge port of said machine. In order to gain heretofore unattainable speed in filling the bags, a centrifugal belt type bag packer preferably is employed similar to that shown in United States Letters Patent to E. A. Marsh, No. 1,979,483, granted November 6, 1934. A plurality of valve bags can be filled at one time. In the form shown, two such bags can be filled simultaneously. Therefore, two packers of the above type are mounted side by side close to one another, and the filling tubes are arranged in groups of two whereby a pair of filling tubes can be brought simultaneously into register with the discharge ports of the packers or bag filling machine. Each of the two packers has associated therewith a hopper into each of which a preweighed charge can be dumped. A pair of scale devices are employed for preweighing each charge, one scale device for each packer. When a pair of charges has been preweighed and when a pair of filling tubes has moved into register with the discharge ports of the dual packer above mentioned, mechanism is actuated for automatically dumping the two preweighed charges into their respective hoppers. The dumping of said charges inaugurates a sequence of events wherein said pair of filling tubes in register with the discharge ports of the packers are retained in register with the discharge ports for a preselected bag filling interval at the expiration of which said movable member, upon which said tubes are mounted, is shifted by a predetermined amount, thereby moving the first-mentioned pair of filling tubes out of register with said discharge ports and moving the next pair into register.

To accomplish this, a timer is actuated in response to the dumping of charges from the preweighing apparatus, which timer measures said preselected interval, for example eight seconds for a charge of one hundred pounds of, for example, sugar, which allows sufficient time for the dumped charges to be filled into the bags. Upon the expiration of this interval, power means are actuated for shifting the movable member and, as above mentioned, moving the next pair of tubes into register with the packer. For example, a clutch is closed thereby transmitting a torque from a motor to said movable member for shifting same through a predetermined increment.

There are four separate stations situated about the movable tube supporting member (Fig. 2) comprising: a bag applying station, a bag filling and settling station, an inactive station, and a bag discharge station. Suitable frame members which are supported by the movable member, carry the filling tubes and have mounted thereupon bag clamps and bag chairs. Automatic mechanism is provided for closing the open bag clamps after the bags have been applied thereto at the bag applying station. Mechanism is provided for jigging or settling the bags, said jigging mechanism becoming operative in response to a pair of tubes moving into register with the packers. An eccentric is provided for accomplishing this jigging and a jigging linkage upon each bag chair successively moves into operative association with said eccentric at the bag filling and settling station.

Automatic mechanism also is provided for successively opening each pair of bag clamps in response to the movement thereof into said bag discharge station. Simultaneously a mechanism is actuated to tilt successively each bag chair whereby each bag is successively discharged from the apparatus after having been filled. The bag clamps mounted upon each frame remain open until shortly after each frame has passed the bag applying station. The bag chair is so constructed and arranged that it moves back to its normal untilted position shortly after each frame has departed from the bag discharge station.

Referring to the drawings in further detail, a brief description of the operation of the device will first be given and a detailed description of the elements will follow.

Packer and rotatable bag support

Referring to the drawings with special reference to Figs. 1 and 2, the novel packer comprises a movable tube support member which, in the form shown, is rotatable about a generally vertical axis and is indicated generally at 20. The latter is constituted by a rotatable main support member, hereinafter sometimes referred to as: (1) a rotatable frame support or (2) a rotatable frame housing 21, upon which are mounted a plurality of frame members 22, 23, 24 and 25. These frame members respectively have mounted thereupon pairs of generally horizontal filling tubes 26, 27, 28 and 29.

A pair of adjacent centrifugal belt packers indicated generally at 30 are mounted within the path of motion of said rotatable frames. Each centrifugal belt packer preferably is similar to that shown in the above-mentioned March Patent 1,979,483 and is constituted by a peripherally grooved pulley or wheel 31, said pulleys being mounted upon a common shaft and each being in contact with a belt 32 which is pressed tightly against a portion of the periphery thereof, thereby forming a trough for material to be carried by centrifugal force through a discharge throat or port 33 and thus into and through a filling tube in register therewith.

The frame members 22–25, inclusive, have associated therewith respectively bag chairs 34, 35, 36 and 37, each of which is mounted for pivotal movement whereby each can be tilted to discharge a bag. And also each bag chair is adapted for a vertical reciprocating motion in response to the rotation of an eccentric 38 (Figs. 1 and 12), such reciprocation occurring when a bag chair moves into the bag filling and settling station. A rocker arm linkage is provided for operatively connecting the eccentric 38 with each bag chair when it moves into the bag filling position. Such a linkage as at 39 (Fig. 1) is provided for chair 35.

Charge weighing apparatus and operative connection to the packer and rotatable bag support As shown in Fig. 1, a pair of charge preweighing devices is provided for successively accurately weighing in advance pairs of charges of material to be dumped into the packer 30. For this purpose, a pair of scales 40 and 41 are provided having respectively scale hoppers 42 and 42a associated therewith. The details of the apparatus for preweighing charges is not shown for purposes of clarity.

Suitable means are provided for intermittently angularly shifting the main support member or rotatable member 21 in preselected angular increments whereby at predetermined intervals the filling tubes can be shifted from one position into the next successive position. In the form shown, the means for accomplishing this intermittent angular movement is constituted by a one-revolution clutch unit 43 which is operatively connected to said rotatable frame support 21 in a manner to appear hereinafter. It is to be understood that intermittent angular movement can be accomplished by means other than a one-revolution clutch, for example, by a pneumatic or hydraulic power cylinder.

The preweighing scales 40 and 41 are operatively associated with said one-revolution clutch 43 through the intermediary of an adjustable timer 44 whereby: (1) upon measuring two complete charges in the hoppers 42 and 42a; (2) and the movement of a pair of tubes, as 27, into register with the discharge ports 33, (3) an electric circuit is completed which actuates said timer 44, thereby commencing the measurement of a predetermined period, for example eight seconds (which is sufficient for the filling of a one hundred pound bag with sugar). At the expiration of this period, said one-revolution clutch 43 is actuated to shift said rotary device 20 through a desired angular interval, in this case ninety degrees. Thus the filling tubes 27 will be moved from the bag filling and settling station to the inactive station (Fig. 2) and the filling tubes 26 will be moved into the bag filling and settling station from the bag applying station. Also, the filling tubes 28 will be moved to the bag discharge station.

An electric motor 45 is in operation to rotate continuously a driving member of the one-revolution clutch 43. Also a second motor 46 is continuously in operation and is operatively interconnected to a belt pulley 32a whereby the belts 32 and wheels 31 are in motion continuously. An operative interconnection also exists between motor 46 and the eccentric 38 for continuously rotating the latter.

The operative interconnection between the scales 40 and 41 and the one-revolution clutch 43 (through the intermediary of said timer 44) is as follows:

Leads 47 and 48 are connected across a secondary coil 47a of a transformer 48a. The latter reduces a line voltage of 220/440 volts down to 110 volts. Three switches 49, 50 and 51 are connected in series in said leads 47 and 48, and are respectively under the influence of the scales 40, 41, and with the rotatable frame support 21. The switches 49 and 50 preferably are of the tiltable mercury type and are closable in response to weighing movement of said scales, thereby indicating that a full charge is supported in their respective hoppers. The switch 51 is normally open, but is closable in response to the movement of a frame such as 23 into a bag filling and settling station whereby the filling tubes, as 27, are brought into register with the discharge ports 33.

When the three switches 49, 50 and 51 are closed, a proper time has been reached at which the preweighed charges can be dumped from the preweigh hoppers 42 and 42a into packer hoppers 52 and 53, respectively, and thence to the two packers. The dumping of these preweighed charges is accomplished by means of a scale dumping solenoid 54 which is actuatable in response to the energization of a relay 55. The solenoid of the latter preferably is interposed in the lead 47. The scale dumping solenoid, in the form shown, is electrically connected to main power leads $L_1$ and $L_2$ by means of the leads 56 and 57. The circuit of the scale dumping solenoids is normally open by virtue of an armature 55a of the relay 55 being held in an open position by means of a suitable spring in a well known manner.

The energization of the relay 55, of course, results in the actuation of the scale dumping solenoid 54, which in turn results in a simultaneous dumping of the preweighed charges in the hoppers 42 and 42a. This is accomplished by means of an operative interconnection between the solenoid 54 and said hoppers comprising, for example, a bell crank lever 58, the angular motion of which can be communicated to suitable release mechanisms of the hoppers 42, 42a in a conventional manner.

An operative interconnection also exists between the scale dumping solenoid 54 and the above-mentioned timer 44. The latter is electrically connected across the secondary coil 47a of the transformer 48a by means of electrical leads 59 and 60. The electric circuit for actuating the timer is controlled by means of a switch 61, the latter being under the influence of said scale dumping solenoid 54 whereby, upon the actuation thereof, the normally open switch 61 is closed.

The timer 44 is adapted for governing the one-revolution clutch 43 through the intermediary of a solenoid 43a. This is accomplished by means of a relay 62 having a solenoid 62a and an armature 62b. The solenoid 62a is in a circuit which is governed by the timer 44, for example, constituted by leads 63 and 64 which are connected across said secondary coil 47a. A timer governed switch 65 is in said circuit and is normally open but can be momentarily closed, for example, eight seconds after the timer is energized. The momentary closing of the switch 65, of course, effects a momentary energization of the solenoid 62a. Thus the armature 62b momentarily will be in a closed position whereby an electric circuit for the solenoid 43a is completed. Solenoid 43a is electrically connected across the power leads $L_1$, $L_2$ by means of the leads 66 and 67, relay 62 being interposed, for example, in lead 66. A switch 68 controlled by clutch 43 is inserted in the lead 67 in order to prevent the energization of the solenoid 43a unless driving and driven parts of the one-revolution clutch 43 are in a proper phase relationship. This will appear more fully hereinafter. An operative interconnection between the switch 68 and the one-revolution clutch 43 is schematically indicated in Fig. 1 at 69.

When the relay 62 is energized and the switch 68 is closed, the solenoid 43a will be energized and the one-revolution clutch will be actuated, whereby the rotatable main support member is angularly shifted through the preselected increment which in the form shown is ninety degrees. Thus the position of each pair of filling tubes is intermittently advanced by ninety degrees whereby each is moved into the next successive position where it is held until the expiration of the adjustable filling time interval.

The operative interconnection between one-revolution clutch 43 and the rotatable frame support 21 will appear more fully hereinafter.

The above-mentioned bag chairs 34-37, inclusive, are preferably mounted for angular motion from a normal untilted bag supporting position to a tilted bag discharge position. Also the bag clamps which are provided for each pair of filling tubes can be simultaneously opened and closed by means of cam mechanism to appear more fully later. For purposes of clarity, the bag tilting and clamp opening and closing mechanisms have been omitted from Figs. 1 and 2. However, the sequence of events regarding clamp and chair control is shown schematically in Fig. 2. The bag clamps for a given pair of tubes preferably are closed shortly after the departure of the pair of tubes from the bag applying station, as at A of Fig. 2. The bag clamps for each pair of tubes remain closed until such pair reaches the bag discharge station as shown at C of Fig. 2. At this point the clamps are automatically opened and the chair is tilted by suitable cam means as will be described hereinafter.

*Detailed description of apparatus*

As shown in Figs. 3 and 4, the novel apparatus constitutes a main frame 70 which is mounted, on two sides thereof, upon side frames or legs 71. The latter in turn are fastened together by means of suitable braces 72 (Fig. 3). The two grooved pulleys 31 are mounted upon a common shaft 31a which is supported by the main frame. These two grooved pulleys 31, as above mentioned, are adapted for receiving respectively preweighed charges of material (one for each pulley) through the adjacent hoppers 52, 53 (Figs. 3 and 4). Suitable hopper spouts 52a and 52b direct each preweighed charge to its respective packer. The feeder belts 32 are driven by the motor 46 through the intermediary of a conventional V belt 73 which transmits power from the motor to the pulley 32a by means of conventional sheaves.

Each belt 32 runs over not only the pulley 32a but over an adjustable idler pulley 32b and a top idler pulley 32c, there being suitable means for adjusting the tension upon said belt by positioning pulley 32b. Each belt 32 is held tightly against a portion of the circumference of the flanges of each pulley, whereby a trough is formed for carrying material through the discharge ports 33 and thence to the filling tubes. The motor 46 can be shifted in order to take up any slack in the V belt 73.

The operative interconnection between the motor 46 and the settler eccentric 38, in the form shown, comprises a V-belt drive from a sheave 74 to a countershaft 75 by a V belt 76 and a sheave 77. The shaft 75 is connected to the eccentric 38 by means of a conventional sprocket chain 78. A sprocket wheel 38a (Fig. 12) is provided for receiving the chain 78 and for communicating torque to the shaft of the eccentric 38. The latter is constituted by a cylinder having upon one side thereof a smooth eccentric portion or bulge 38b which increases to a maximum diameter at the mid-point of the eccentric, thereby facilitating the movement of each rocker mechanism 39, as in Fig. 1, into register beneath said eccentric while the latter is rotating rapidly.

As shown in Fig. 4, the filling tubes are mounted upon the main support member or rotatable frame housing 21 by means of the frame members 22-25, inclusive. The rotating frame housing is rotatably mounted upon a support rail 79 (Figs. 5 and 6) by means of eight support rollers 80, four centering rollers 81 and four check rollers 82, the latter being designed for preventing vertical movement of the frame housing 21. The support rail 79 is secured to the main frame by suitable brackets (not shown).

The one-revolution clutch 43 (Fig. 3) is powered by the electric motor 45 and interconnected thereto by means of a double V-belt 83, the latter passing over conventional double sheaves 84 and 85 on the motor and clutch drive shafts respectively. The motor and the one-revolution clutch are sometimes hereinafter referred to as a drive unit.

A torque from the drive unit is communicated to the rotatable frame support member 21 by means of a vertical drive shaft 86 which is connected to the driven portion of the one-revolution clutch and to a linkage (Fig. 5) for engaging and angularly shifting the frame support member 21.

The frame members 22-25, inclusive, preferably are connected near the lower extremities thereof by means of suitable brackets or braces 87 (Fig. 4) in order to maintain a desired frame rigidity when the apparatus is in operation. Such rigidity is further attained by means of a guide rail 88 (Fig. 3) into groove 88a of which there extends shoe members 89 (Figs. 7 and 10) which are pivotally associated with the frame members, and which assist in preventing vertical movement of the frames under the influence of the bag settling apparatus. Each frame is provided with two shoes 89.

It frequently becomes desirable to clean not only said filling tubes but also the discharge throat member 33. This is done by pivoting each pair of filling tubes down and away from its respective frame member, and by lifting each discharge throat member out of its normal position and into a raised cleaning position. The means for pivoting each pair of filling tubes away from is frame member is shown in Fig. 8 and comprises a pivotally mounted filling tube bracket 90, to which said tubes are secured. A bracket 90 is provided for each pair of filling tubes and is pivotally mounted by means of pivot pins 91 upon the frame members. Detent mechanisms 92 are associated with each bracket 90 for releasably holding the latter in position. Each detent comprises an axially shiftable detent pin 93 which can be withdrawn from engagement with the bracket 90 by angularly shifting a handle 94. The latter, by means of a conventional cam arrangement, axially shifts said detent pin 93 and thus withdraws same, freeing the brackets 90 for pivotal movement about pin 91.

The means for moving the discharge throat members 33 to an accessible position (Fig. 3) constitute a toggle operated linkage 95 having a handle 96 which, when thrust inwardly, will communicate a counterclockwise torque to its respective discharge throat member through the intermediary of an arm 97 which is mounted upon the shaft 31a. A latch member 98, which cooperates with the handle 96, prevents the lifting of the discharge throat members during operation of the machine. Each packer is provided with a separate throat lifting linkage as above described.

Each pair of filling tubes, for example, pair 26 (Figs. 7, 8 and 10) has associated therewith suitable bag clamps as at 99L, 99R. These bag clamps are mounted upon shafts 100L and 100R, respectively, and are operatively interconnected in such a manner that a cam can open both simultaneously by moving relative thereto and another cam can close both by relative movement. The inner arms of the bag clamps are connected for toggle movement whereby the clamps can be held either in a closed or open position by virtue of a toggle action. Interconnecting toggle arms are indicated at 101L and 101R, the latter including an axially shiftable member 102 which is urged toward a pivotal interconnection 103, for said arms 101L and 101R, by means of a spring 104. A cam roller 105 is mounted at the pivotal interconnection 103, and links 106 interconnect the inner and outer clamping arms respectively of said clamps. Thus, an upward thrust upon the cam roller 105, as viewed in Fig. 8, will move the pivot 103 above a line interconnecting the main clamp pivot shafts 100L and 100R, and the two clamps will be opened and there retained by virtue of said toggle action, until a downward thrust closes the clamps. The interconnection of the links 101L and 101R, and the links 106 results in both bag clamps operating simultaneously.

Means for actuating the clamp toggle linkage, in the form shown, comprises an opening cam 107 (Fig. 3) and a closing cam 108 which cooperate with roller 105. The relative disposition of these cams is shown in Fig. 2 at positions A and C respectively.

The linkage for communicating a settling motion from the eccentric 38 (Figs. 1, 12) to the bag chairs is shown in Fig. 7, for example, in connection with bag chair 34, which is mounted in a manner typical of all of the bag chairs. Chair 34 is mounted for pivotal movement about a pivot pin 34a which is to the right of the center of gravity of the bag chair as viewed in Fig. 7. Yielding means, such as a spring 34b, urge the bag chair towards a normal level position. Bag chair 34 is adapted for vertical reciprocating motion by means of a vertical bag chair post 109 to which the bag chair 34 is secured by a bag chair bracket 110. The post 109 is secured to a bag chair post bracket 111 which is in direct operative association with the above-mentioned rocker arm 39. The latter is pivotally mounted at 112 upon the frame member 22. One extremity of the arm 39 is pivotally secured to the bracket 111 and the opposite extremity has secured thereto a roller 39a which is adapted for cooperating with the eccentric 38. A check link 113 is pivotally secured to the frame 22 and to the bracket 111 in a conventional manner in order to stabilize the bag chair in its reciprocating vertical motion. Thus, oscillation of the rocker arm 39 raises and lowers the bag chair 34, thereby settling material in the bag. In order yieldingly to urge the roller 39a into contact with the eccentric 38, a compression spring 114 is provided which resiliently holds rocker 39 in a desired position.

The eccentric 38 will engage the roller 39a at top portion thereof as viewed in Fig. 7 thereby urging the rocker in a counterclockwise direction. This will be resisted by the spring 114 which consequently will maintain the roller 39a in contact with the eccentric 38.

The mechanism for tilting the bag chair for bag discharge is shown in Figs. 3, 7 and 9, and constitutes a lever arrangement which is actuated by a cam for overcoming the spring 34b and tilting each bag chair about the axis of the pin 34a. This linkage is constituted by a pair of arms 115 and 116 which are keyed to a common shaft 117 and are mounted for rotation in suitable bearings 118, which in turn are supported by each frame member. As shown in Fig. 9, the bearings 118 are supported in frame member 22. At the extremities of the arms 115 and 116 there are mounted rollers 115a and 116a, respectively. The latter is adapted to communicate a thrust to the bag chair, for example, bag chair 34, by means of a suitable thrust transmitting bracket 119 (Fig. 7) which is secured to the bag chair 34. Thus, an upward thrust upon the roller 115a will be transmitted to the bag chair to tilt same and to discharge a bag thereupon. As indicated in Fig. 2, the bag chair is to be tilted at "C." This is accomplished by means of a chair tilting cam 120 (Fig. 3) which is situated approximately at "C" (Fig. 2). It is possible to adjust the position of the chair tilting cam so that the tilting of the bag chair will commence just prior to the reaching of the discharge station whereby the actual discharge of the bag occurs at said station 4.

A detailed description will now be given of the one-revolution clutch 43 and the apparatus immediately related thereto, especially the one-revolution clutch solenoid 43a, and the linkage interconnecting said clutch with the rotatable frame housing 21.

The one-revolution clutch 43 and certain of its closely related elements are shown in detail in Figs. 13 to 16, inclusive. These parts will now be described.

Power from the clutch motor 45 is communicated to the one-revolution clutch 43 by means of the above-described sheave 85 (Fig. 13). This sheave is keyed to a shaft 85a, which, by means of a worm 121, keyed to the shaft 85a, drives a worm gear driving member 122 of the clutch. A clutch ring 123 is secured to the worm gear 122 and rotates therewith. The angular velocity of the worm gear and clutch ring is, for example, fifteen revolutions per minute. The motor 45 drives the worm and the worm gear 122 continuously. The driving member 122 is rotatably mounted upon a suitable shaft 124 by means of bearings 125.

The driven member of clutch 43 is constituted by a spider 126 having a hollow central sleeve 127 into which drive shaft 86 fits in keying engagement. Spider 126 cooperates with clutch ring 123 to engage and disengage the clutch in a manner to appear hereinafter.

Clutch ring 123 is provided with a plurality of notches or grooves 123a, upon the inner surface thereof. In the form shown, there are two such notches or grooves 123a as shown in Fig. 13, these being situated at 180° intervals.

The means for interconnecting the driving and the driven portions of the clutch 43 constitute a pair of clutch pins 128, 129 which are mounted for angular movement upon the spider 126.

As shown in Fig. 15, the clutch pins 128 and 129 have sections cut therefrom intermediate the extremities thereof at 128a and 129a, respectively, thereby reducing by one-half the cross-sectional area of each of the pins over a part of the lengths thereof. The clutch ring 123 is adapted for cooperating with the portions of the clutch pins 128, 129 which have been so cut away or reduced. Said pins can be angularly positioned whereby the ring 123 will rotate free of the clutch pins without engaging same. However, if these pins are shifted angularly in order to engage the notches 123a, then power will be transmitted from the driving member 122 to the spider 126 and thence to the shaft 86.

In the form shown, the clutch pins 128, 129 are disposed on diametrically opposed sides of the spider 126, and are connected together for simultaneous angular movement. The linkage for so connecting them is constituted by a sleeve member 130 which is loosely mounted for angular movement about the hollow central sleeve 127. Member 130 has diametrically opposed arms 130a and 130b attached thereto which in turn are respectively connected to the clutch pins 128, 129 by means of links 131 and 132. These links in turn cooperate with suitable levers 133 and 134 which are keyed to their respective cultch pins. A limit-stop 135 is secured to the clutch pin 128 and is adapted for coming up against a side of the above-mentioned shaft 127 thereby preventing the further angular movement of both of the clutch pins.

When the clutch pin mechanism is in the position shown in Fig. 13, the clutch is engaged and power is transmitted to the driven shaft 86. The relative position of the cut away portion 128a is shown in dotted lines in Fig. 13 and indicates that the pin 128 is in engagement with the clutch ring 123.

The clutch pins are biased by means of a spring 136 towards a position of engagement with the clutch ring 123.

The clutch is maintained in a disengaged position whenever clutch pin latch lever 137 is in engagement with a clutch latch rod 138, the latter being controlled by the above-mentioned clutch control solenoid 43a. When the lever 137 and the latch rod 138 are in engagement, as a result of rotation of lever 137, the spring 136 will be overcome and the clutch pins will be moved to a position in which they clear the notches 123a of the clutch ring 123. However, when the latch rod 138 is withdrawn, the spring 136 will urge the clutch pins angularly to an engaged position whereby the clutch will be engaged.

The solenoid 43a is connected to the latch rod 138 by means of a suitable linkage comprising a bell crank 139 which at one extremity is connected to said solenoid by a link 140 and at the other extremity it is connected to a latch rod 138 by a suitable conventional yoke mechanism. The latch rod 138 is normally urged into an active position, whereby it will be in the path of the lever 137, by means of a spring 141 (Fig. 15). The solenoid 43a is able to overcome the spring 141 when it is energized, and thus to withdraw the latch rod 138.

The above-mentioned safety limit switch 68 (Figs. 1 and 13) is closed only when the clutch pins 128, 129 are in alignment with notches 123a of the clutch ring 123. Thus it is impossible to engage the clutch when said pins and notches are not in alignment. The reason for such a safety limit switch is to avoid shock and damage to the clutch which might result if the clutch pins were suddenly turned when such alignment did not exist. The connection between the safety limit switch 68 and the clutch 43 is shown in Fig. 14, and constitutes a cam 142 which is mounted upon the clutch ring 123. The cam 142 cooperates with a spring biased plunger or shaft 143 mounted for axial movement within a sleeve member 143a. At the top of the sleeve, as viewed in Fig. 14, a cross-pin 143b is provided which extends through a slot 143c of shaft 143. The axial extent of said slot determines the limits of axial movement of the shaft 143. Interposed between the sleeve 143a and a collar of the shaft 143 is a spring 144 which urges said shaft downwardly (Fig. 14) and into the path of the cam 142.

The shaft 143 is connected to the safety limit switch 68 by means of a suitable lever 68a (Fig. 13) whereby said switch is closed whenever the clutch pins 128, 129 are in alignment with the notches 123a. The limit switch 68 is normally open and is closed in response to said cam 142 engaging the plunger 143.

From the above it will be seen that energization of the solenoid 43a (Fig. 15) will retract the clutch latching pin 138, withdrawing same from the path of the lever 137 and thereby engaging the clutch. Thereafter the shaft 86 will rotate one revolution. The latch rod 138 will immediately return to its normal position after it has been momentarily retracted because the solenoid 43a is only momentarily energized by the timer 44. Consequently, after the clutch has completed one revolution, the lever 137 will strike the latch rod 138 and the clutch will be disengaged.

The upper extremity of shaft 86 is shown in Fig. 16. A crank 145 is splined to the upper extremity of the shaft 86 and communicates angular motion to the rotatable frame housing by means of a linkage, to appear later. A suitable bearing (Fig 16) is provided for the upper extremity of the shaft 86, and a stationary cam 146 (Figs. 5 and 16) is secured to an outer housing 146a, said stationary cam cooperating with the linkage for connecting the crank 145 to the rotatable frame housing in a manner also to appear hereinafter.

Linkage between clutch and rotatable frame housing or index ring

The linkage between clutch 43 and the rotatable frame member 21 will now be described with particular reference to Fig. 5.

The rotatable member 21 and elements which are attached thereto are of considerable weight and must be angularly shifted in such a manner that their intermittent starting and stopping will not damage the remainder of the apparatus by violent vibration. Consequently, it is necessary slowly to start and stop the angular movement of said rotating member. Thus means must be provided for cushioning the starting and stopping. This can be accomplished by a uniform and relatively slow acceleration and deceleration. The linkage for transmitting the movement of the clutch driven shaft to the rotatable members cooperates with said stationary cam 146 in such a manner to produce said uniform acceleration and deceleration.

As shown in Fig. 5, a centrally disposed arm or index lever 147 is mounted upon a suitable central shaft for angular movement thereabout. At the outer extremity of the index lever 147 there is located a suitable mechanism for engaging an index ring 148 and for moving same through a desired angular increment by means of said crank 145 and connecting linkage.

The index ring 148 is secured to member 21 for angular movement therewith, and has formed therein a plurality of grooves or slots 148a. There are four slots 148a, in the form shown, the number being similar to the number of frame members (22-25, inclusive). Transversely disposed to slots 148a are slots 148b which have axes substantially parallel to the axis of rotation of the index ring. The latter slots are adapted for engaging a suitable tongue, as will appear hereinafter, to suppress backlash.

Fulcrumed upon a pin 147a at the outer extremity of the index lever 147 is a pusher lever 149 which has a roller 150 rotatably mounted at the outer extremity thereof. A suitable spring (not shown) is associated with the pusher lever 149 to urge same in a clockwise direction as viewed in Fig. 5. Also fulcrumed upon the pin 147a is a latching lever 152 in the form of a bell crank having one portion 152a extending in a generally opposite direction from a portion 152b. The latching lever 152a is adapted for engaging one extremity of the groove 148a, and said roller 150, upon the pusher lever 149, is adapted for engaging the opposite extremity of said groove 148a whereby a positive gripping of the index ring is effected and no backlash is permitted during the angular shifting of said ring. The latching lever 152 is biased in a counterclockwise direction by means of a spring (not shown). The portion 152b by means of a roller 152c is adapted for engaging a suitable cam 152d (Figs. 5 and 17) and to disengage the portion 152a from ring 148 to permit return movement of the index lever 147 to the next successive groove 148a.

The linkage connecting the crank 145 and the index lever 147 is constituted by an arm 153 which is fulcrumed at 154 upon the extremity of the crank 145. The arm 153 extends on opposite sides of the fulcrum 154. A roller 155 is mounted upon one extremity of the arm 153 and the opposite extremity is connected to the index lever 147 by means of a link 156. Rotation of the crank 145 through the intermediary of the one-revolution clutch, thus will angularly shift the index lever 147 through ninety degrees, and roller 155 will ride over the stationary cam 146 which is shaped to provide a desired acceleration and deceleration of the motion of the index lever 147.

*Indexing or holding device*

The means for holding the index ring 148 at a desired angular position while the bag filling operation takes place is shown in detail in Fig. 17, and in general constitutes a backlash inhibitor 157 and a detent 158. The former is adapted for cooperating with a notch or groove 148b (Fig. 17). The latter is adapted for cooperation with a recess 158a. There are four such notches 157a and four recesses 158a situated at angular intervals of ninety degrees.

The backlash inhibitor 157 is pivotally mounted upon a suitable bracket 159 at 160. A spring 161 urges the member 157 in a clockwise direction as viewed in Fig. 17 and thus toward the index ring 148.

The mounting for the detent 158 is as follows: Mechanism is provided for yieldingly urging detent 158 towards the index ring 148, comprising a lever 162 which is pivotally mounted at 163 upon a bracket 164. The latter is preferably secured to one of the hopper spouts 52a. The detent 158 is pivotally attached to the lever 162 at 165, and said lever is urged in a counterclockwise direction as viewed in Fig. 17 by means of a spring 166 which is secured to a portion 162a of lever 162.

In order to provide a cushion for arresting the motion of the index ring 148, a dashpot 167 is associated with the detent 158 and the lever 162 in such a manner that vibration and shock due to the stopping of the index ring is substantially suppressed. Dashpot 167 is shown in detail in Fig. 19. The base of the dashpot is pivotally secured at 168 to a portion of the lever 162, and a plunger 167a of the dashpot is secured by suitable yoke to the detent member 158.

The dashpot 167 is provided with a needle outlet valve 169 which can be adjusted to any desired orifice. A spring 170 holds the plunger 167a in a desired position. After the air in the dashpot has been driven out past the valve 169, it can reenter the dashpot by means of a valve 171 comprising a one-way ball valve. Spring 170 normally will hold piston 167b of the dashpot in approximately a mid position between its limits of motion. In the form shown in Fig. 19, the spring 170 is in a compressed condition.

When it is desired to shift the indexing ring 148 angularly, it is desirable to lift the detent 158, together with the roller on the end thereof, out of the recess 158a. This is accomplished in response to angular movement of the crank 145 (Fig. 5). The operative interconnection between the crank 145 and the detent 158, for the above purpose, is shown partially in Figs. 5, 17 and 18. In the latter figure, an arm 170 is keyed to the shaft 163 upon which the detent 158 is mounted through the intermediary of the lever 162. Thus angular motion of the arm 170 will be transmitted to the detent 158 by means of the lever 162. As shown in Fig. 17, the extremity of the arm 170 is adapted for engaging the roller 155, immediately when the latter commences to move in response to motion of the crank 145. Thus the shaft 163 (Fig. 17) can be shifted angularly in clockwise direction, as viewed in Fig. 17, to lift the detent 158 out of the recess 158a and thereby to release the index ring 148 for angular movement.

There is thus provided novel means for increasing the production rate of a bag filling apparatus to a point hitherto unattained. In bag filling machines heretofore suggested there has been localized as a single station: (a) the application of bags; (b) the filling of bags; and (c) the discharge of bags. In the present apparatus these three steps are distributed over three different stations through the intermediary of a wheel-like element upon which the filling tubes are mounted which moves the tubes past these three stations. The distribution of the above three functions or steps over three different stations is done in such a manner that one man can operate the machine. Even though only one operator is required for this machine, its output reaches a peak which has not before been attained with this type of packer.

Although only one embodiment of the present invention has been illustrated and described in detail, it is to be expressly understood that the invention is not limited thereto. For example, instead of employing the mechanical linkage, as shown in Fig. 5, between the one-revolution clutch and the index ring 148, it is possible to employ a pneumatic or hydraulic power cylinder for shifting the rotatable frame housing through ninety degrees after each filling. Moreover, such a pneumatic power cylinder can supplant the one-revolution clutch and can be actuated in response to the energization of the solenoid 43a in any suitable manner. Also, it is possible to alter the number of pairs of tubes which are mounted upon the rotatable frame housing and thus to alter the angular increment through which said housing is shifted. Thus it may be possible to employ eight pairs of filling tubes instead of only four pairs. Also it may be possible to employ a treble or quadruple packer instead of a dual packer. This, of course, will make necessary the employment of three or four filling tubes per group. Various changes may be made in the design and arrangement of the parts of the invention as the same will now be understood by those skilled in the art. For a definition of the invention, reference will be had primarily to the appended claims.

What is claimed is:

1. In apparatus of the class described, the combination with a valve bag packer having a discharge throat of: a member mounted for movement relative to said packer; a plurality of valve bag filling tubes mounted upon said member, each tube being shiftable successively in response to movement of said member, from a bag applying station, to a bag filling station, and thence to a bag discharge station; each tube, when in the bag filling station, being in register with the discharge throat of the packer; a scale mechanism for weighing successive charges of material for said packer; mechanism for dumping a weighed charge of material from said scale mechanism into said packer in response to the movement of a filling tube into said bag filling station and in response to weighing movement of said mechanism; power mechanism for shifting said member through a preselected interval; a timer actuatable by said scale dumping mechanism and operatively connected to said power mechanism for actuating the latter a predetermined time interval after the dumping of each charge into said packer; and mechanism for discharging a bag from each tube in response to the movement of each tube into the bag discharge station.

2. In a valve bag filling machine, the combination with a plurality of packers each having a discharge throat of: a plurality of groups of generally horizontal valve bag filler tubes, each group having a number of filling tubes equal to the number of packers; mechanism for mounting said groups of tubes for movement about a common axis and successively past a bag applying station, a bag filling station wherein the tubes of a group are in register with their respective packer throats, and a bag discharge station; a plurality of valve bag clamp groups, each of the latter groups being associated adjacent a corresponding group of tubes for holding bags in filling relationship to said tubes; a like plurality of tiltable bag chairs mounted for cooperation with respective of said tubes for supporting bags in filling relationship to such tubes; power mechanism operatively connectable to said mounting mechanism for shifting same through an increment sufficient to move each group of tubes to the next successive station; a plurality of charge preweighing mechanisms, equal in number to the number of packers, for successively preweighing groups of charges; a timer operatively connected to said preweighing mechanisms and actuated thereby and also operatively connected to said power mechanism for actuating the latter a predetermined time interval after the dumping of each group of charges; mechanism for closing the bag clamps of each group after reaching the bag applying station and before reaching the bag filling station; mechanism for opening the clamps of each group when each has reached the bag discharge station; and mechanism for tilting each bag chair successively in response to movement of each chair into the bag discharge station.

3. In a valve bag filling machine, the combination comprising: a plurality of packers; a plurality of groups of filling tubes, each group having a number of tubes equal to the number of packers; mechanism for mounting said groups of tubes relative to said packers for movement successively from a bag applying station to a bag filling station wherein the tubes of each group are in position relative to respective of said packers for receiving charges, and to a bag discharge station; power mechanism operatively connectable to said tube mounting mechanism for shifting same through a selected increment sufficient to move each group of tubes to the next successive station; a plurality of charge weighing mechanisms, equal in number to the number of packers, for successively weighing successive groups of charges; mechanism operatively connected with said tube mounting mechanism and said charge weighing mechanisms for dumping a group of charges from the latter mechanisms in response to weighing movement of such latter mechanisms and in response to movement of a group of filling tubes into said bag filling station; a timer operatively connected to said weighing mechanisms, and actuatable in response to the dumping of a group of charges therefrom, for actuating said power mechanism a predetermined interval after the dumping of each group of charges; and mechanism for successively discharging the bags from each group of tubes in response to the movement of each tube group into said bag discharge station.

4. In apparatus of the class described, the combination with a valve bag packer having a discharge throat, of a rotatable member, a plurality of valve bag filling tubes mounted upon said member, each of said tubes being adapted for moving successively into register with the discharge throat of the packer in response to angular movement of said member; weighing mechanism for successively weighing predetermined charges of material for said packer, said mechanism having a weigh hopper; dumping means operative in response to weighing movement of said weighing mechanism and to movement of a filling tube into register with the discharge throat for dumping a charge from the weigh hopper into said packer; power mechanism for angularly shifting said rotatable member a preselected angular amount; a timer operatively connected to said dumping mechanism for actuating said power mechanism a predetermined time after the dumping of a charge into said packer whereby the next successive filling tube is brought into register with the discharge throat of the packer; and means for automatically discharging a bag from each of said filling tubes after each tube has moved out of register with the discharge throat of the packer.

5. In apparatus of the class described, the combination with a valve bag packer having a discharge throat, of: a member mounted for angular movement about a generally vertical axis; a plurality of substantially horizontal filling tubes mounted upon said member and adapted for being shifted successively in response to angular movement of said member, from a bag applying station, to a bag filling station wherein each is in register with the discharge throat, and thence to a bag discharge station; a like plurality of bag clamps mounted for cooperation with said tubes for holding bags thereon; a like plurality of bag chairs, each chair being mounted for cooperation with a corresponding tube for holding bags in filling relationship thereto; bag clamp closing mechanism operable successively to close each clamp after passing the bag applying station; mechanism for successively feeding predetermined charges of material to said packer in response to successive movements of said tubes into bag filling position; mechanism for intermittently angularly shifting said member whereby said tubes are moved intermittently to said successive station; mechanism for opening each of said bag clamps in response to movement thereof into said bag discharge station; and mechanism for tilting each of said bag chairs also in response to movement thereof into said bag discharge station.

6. In apparatus of the class described, a dual centrifugal belt packer having a pair of discharge ports, a rotatable indexing ring mounted for angular movement relative to said packer about a generally vertical axis; a plurality of pairs of filling tubes mounted upon said ring and movable successively into register with said pair of ports in response to angular movement of said ring; means for intermittently angularly shifting said ring for bringing successive of said pairs of tubes into register with said pair of ports; and means for successively discharging pairs of bags upon said pairs of tubes in response to angular movement of each pair of tubes beyond said discharge ports.

7. In apparatus of the class described the combination with a plurality of packers each having a discharge port, of a movable member mounted for movement relative to said packer; a plurality of groups of generally horizontal bag filling tubes mounted upon said movable member adapted for being brought successively into register with the discharge ports of said packers in response to movement of said member; a like plurality of bag chairs, each being mounted for cooperation with a corresponding filling tube for supporting a valve bag in filling relation thereto; mechanism for successively shifting said member through a predetermined increment for bringing successive of said groups of tubes into register with their respective discharge ports; a timer operatively associated with said last-named mechanism for actuating same after each expiration of a preselected interval; and mechanism for tilting each of said bag chairs successively and discharging the bags supported thereby in response to movement of each filling tube a preselected distance beyond the discharge ports.

8. In apparatus of the class described, the combination with a packer having a discharge throat of: a tube support member mounted for angular movement relative to said packer about a generally vertical axis; a plurality of filling tubes mounted upon said member and adapted for being brought successively into register with the discharge throat of the packer in response to angular movement of said member; a like plurality of bag clamps mounted for cooperation respective of said filling tubes for detachably holding bags thereupon; a like plurality of bag chairs, each being positioned with respect to a corresponding filling tube for holding a bag in filling relationship to the tube; mechanism for automatically closing said bag clamps successively in response to a predetermined angular movement of each of said tubes from a bag applying station; mechanism for angularly shifting said rotatable member in preselected angular increments whereby each filling tube is moved successively from said bag applying station, to a bag filling station, and thereafter to a bag discharge station; a scale mechanism for weighing successively a plurality of charges of material of predetermined weight; mechanism for dumping a charge into said packer in response to a filling tube moving into register with the discharge throat of the packer; a timer operatively connected to and actuatable by said scale dumping mechanism for measuring a predetermined time interval between angular movements of said member commencing with the dumping of the charge into the packer; mechanism at said bag discharge station for opening each of said bag clamps as each moves into said station; and mechanism for tilting each of said bag chairs as each moves into said bag discharge position.

9. In apparatus of the class described, scale means for weighing charges of material of predetermined weight; a hopper; dumping mechanism for dumping the weighed charges into said hopper; a packer having a discharge throat; a movable support member; a plurality of filling tubes mounted upon said member, said member being adapted for movement relative to the discharge throat of the packer whereby said filling tubes are successively brought into register with the discharge throat, each of said tubes being shiftable from a first location comprising a bag applying station, to a second location comprising a bag filling station, and thence to a final location comprising a bag discharge station; mechanism for actuating said scale dumping mechanism in response to a predetermined weight of material on said scale and in response to movement of a filling tube into register with the discharge throat; a timer actuatable in response to the dumping of said scale for measuring a predetermined period during which said member is maintained stationary for the filling of a bag in the bag filling station; mechanism operatively connected to said timer for shifting said rotatable member through a preselected increment at the expiration of each of the predetermined filling periods; and mechanism for successively ejecting bags from said tubes in response to the angular movement of each tube into the bag discharge station.

10. In a bag filling machine, the combination comprising: a centrifugal belt type packer, a plurality of generally horizontal filler tubes adapted to have bags slipped over the ends thereof, means for mounting said tubes for rotation about a common generally vertical axis and successively past a bag applying station and then to a bag filling position in filling relation with said packer, a like plurality of bag clamps for holding bags in filling relationship to said tubes, each bag being associated with a corresponding tube, means actuated in timed relationship with the rotation of said mounting means for closing said bag clamps successively after each tube passes the bag applying station and before each reaches the bag filling position, means for opening said clamps successively after each has passed the filling position, mechanism for intermittently angularly shifting said mounting means, and mechanism for governing the period between intermittent angular movements of the mounting means.

11. In apparatus of the class described, the combination with a valve bag packer having a discharge throat of: a member mounted for movement relative to said packer; a plurality of valve bag filling tubes mounted upon said member, each tube being shiftable successively in response to movement of said member, from a bag applying station, to a bag filling station, and thence to a bag discharge station; each tube, when in the bag filling station, being in register with the discharge throat of the packer; a scale mechanism for weighing successive charges of material for said packer; mechanism for dumping a weighed charge of material from said scale mechanism into said packer in response to the movement of a filling tube into said bag filling station and in response to weighing movement of said mechanism; power mechanism for shifting said member through a preselected interval; and a timer actuatable by said scale dumping mechanism and operatively connected to said power mechanism for actuating the latter a predetermined time interval after the dumping of each charge into said packer.

12. In apparatus of the class described, the combination with a valve bag packer having a discharge throat, of a rotatable member, a plurality of valve bag filling tubes mounted upon said member, each of said tubes being adapted for moving successively into register with the discharge throat of the packer in response to angular movement of said member; weighing mechanism for successively weighing predetermined charges of material for said packer said mechanism having a weigh hopper; dumping means operative in response to weighing movement of said weighing mechanism and to movement of a filling tube into register with the discharge throat for dumping a charge from the weigh hopper into said packer; power mechanism for angularly shifting said rotatable member a preselected angular amount; and a timer operatively connected to said dumping mechanism for actuating said power mechanism a predetermined time after the dumping of a charge into said packer whereby the next successive filling tube is brought into register with the discharge throat of the packer.

CARL H. HARTMAN.
    WILLIAM R. PETERSON.
    DONALD D. GRISWOLD.

REFERENCES CITED

The following references are of record in the file of this patent:

UNITED STATES PATENTS

| Number | Name | Date |
| --- | --- | --- |
| 619,834 | Nickerson | Feb. 21, 1899 |
| 947,096 | Crowley | Jan. 18, 1910 |
| 992,148 | Bates | May 16, 1911 |
| 1,926,802 | Currier | Sept. 12, 1933 |
| 1,953,646 | Currier | Apr. 3, 1934 |
| 2,022,867 | Middeboe et al. | Dec. 3, 1935 |
| 2,051,565 | Marsh et al. | Aug. 18, 1936 |
| 2,100,874 | Ryan et al. | Nov. 30, 1937 |
| 2,418,263 | Hurst | Apr. 1, 1947 |